United States Patent [19]

Sleevi

[11] Patent Number: 4,811,382

[45] Date of Patent: Mar. 7, 1989

[54] METHOD AND APPARATUS FOR APPLYING MESSAGES IN A TELECOMMUNICATIONS NETWORK

[76] Inventor: Neil F. Sleevi, Rte. 1, Box 144, Weston, Mo. 64098

[21] Appl. No.: 903,993

[22] Filed: Sep. 5, 1986

[51] Int. Cl.$^4$ .................. H04M 3/02; H04M 3/42
[52] U.S. Cl. ........................ 379/67; 379/87; 379/202; 379/257; 379/374
[58] Field of Search .............. 379/67, 88, 257, 372, 379/374, 82, 84, 87, 201, 202

[56] References Cited

U.S. PATENT DOCUMENTS

| | | | |
|---|---|---|---|
| 4,277,649 | 7/1981 | Sheinbein | 379/201 |
| 4,451,704 | 5/1984 | Winkelman | 379/67 |
| 4,510,349 | 4/1985 | Segre-Amar | 379/87 |

FOREIGN PATENT DOCUMENTS

| | | | |
|---|---|---|---|
| 1198843 | 12/1985 | Canada | 379/88 |
| 3306313 | 8/1984 | Fed. Rep. of Germany | 379/88 |
| 0087661 | 6/1982 | Japan | 379/257 |
| 0108855 | 6/1983 | Japan | 379/88 |
| 2170377 | 7/1986 | United Kingdom | 379/88 |

Primary Examiner—Thomas W. Brown
Attorney, Agent, or Firm—Kokjer, Kircher, Bradley, Wharton, Bowman & Johnson

[57] ABSTRACT

In a telecommunications network, a system for applying messages or data to the customer lines of calling parties during the "ringback" period of telephone call set up. The messages are preferably applied between successive ringback tones during the ringback period and are terminated when the called party answers the call. Advertising messages, civic or company announcements, political messages, informational messages (e.g. news or weather), or other data can be transmitted on the telephone lines during what is otherwise essentially unused times when the line is already tied up.

12 Claims, 3 Drawing Sheets

METHOD AND APPARATUS FOR APPLYING MESSAGES IN A TELECOMMUNICATIONS NETWORK

BACKGROUND OF THE INVENTION

This invention relates in general to the field of telecommunications and deals more particularly with a method and apparatus for applying messages and other communication signals to telephone lines.

Telecommunications networks include customer stations (typically ordinary telephone sets) which are linked together via switching centers in order to provide communication paths between the calling station and the called station. The switching center is usually a telephone company facility commonly known as a "central office", although it can also be a toll office, a private branch exchange (PBX) or a key telephone system. The switching function of the switching center is performed by a switching network which is controlled by a control complex and which at times switches various service circuits into the communication path. The service circuits include wrong number announcements and changed number announcements, digit receivers, tone generators and other peripheral equipment that performs specialized service functions. The transmission lines include customer lines which connect each customer station with a switching system and trunks which connect the switching systems with one another.

Telephone call setup involves, as the first step, the calling party taking his telephone "off hook", thus closing the switch hook contacts of the telephone to inform the local switching system of a request for service. The control complex of the switching system then applies a dial tone signal to the calling line and prepares to accept the digits that are to be dialed. When the number addressed by the calling customer station is dialed, the digits are accepted and interpreted by the control equipment at the central office. The initial digits (usually the first three) provide information as to whether the called station is serviced by the same or another central office. If the call is an inter-office call, the originating office selects an idle trunk to the terminating office if one is available.

When an available trunk is seized, it is connected with the calling customer's line through the switching network in the originating central office. The digits of the called number are then transmitted over the trunk to the terminating central office which determines the status of the called customer's line. In modern "common channel signaling systems", the called number is changed to a digital data message and sent over a separate circuit referred to as a "common channel signaling circuit". If the telephone at the called station is busy (off hook), an audible busy signal tone is applied to the calling party's line. If the called telephone is idle (on hook), a ring signal is applied to its customer line for activating the ringer in the called party's telephone. At the same time, a different but similar ringback signal is applied to the calling party's customer line by the ringback equipment in the terminating central office. In the newest "common channel signaling systems", a digital data signal to the originating central office may activate the application of the ringback signal to the calling party's line. The ringback signal is applied at 440 and 480 Hz. and takes the form of audible tones which are applied for a duration of two seconds each with an interval of 4 seconds between successive tones.

If the called telephone is answered, its off hook status causes termination of the ringback signal. At the end of the conversation, the telephones are returned to on hook status, and the customer lines and trunk revert to idle status. Intra-office calls are processed similarly, except that there is no need for seizure of a trunk because the call can be routed through the switching network in a single central office.

In recent years, telephone transmission facilities have been used to transmit various types of data in addition to ordinary telephone conversations. For example, it is now common for computers to communicate via telephone transmission lines. Facsimile machines and other modern machines transmit information over telephone lines. Stock market information, weather data, commodity prices, news and other data are also often transmitted by telephone. It is also common for music and/or commercial messages or announcements to be applied to telephone lines, especially when a party is placed on "hold" while waiting to speak to someone. However, to my knowledge, telephone lines have not been used to transmit messages or data during the ringback period when the calling party is waiting for the called party to answer.

SUMMARY OF THE INVENTION

It is the principal object of the present invention to provide a method and apparatus for applying messages to calling parties during the times when the calling party is receiving ringback signals while waiting for the called party to answer a call. By making use of this heretofore unused time, the telephone network facilities are utilized more effectively for the transmission of information. At the same time, messages are transmitted only during times when the telephone line is already occupied, so there is no increase in the extent to which available lines are tied up.

In accordance with the invention, messages such as recorded commercial advertising messages are applied to the customer lines of calling parties during the ringback period when the customers are waiting for a call they have placed to be answered. The equipment for implementing the system is located in the switching centers and usually includes a ringback detector which detects the application of a ringback signal to the calling customer's line. A timer is then activated to control the application of a recorded message to the line in a manner to assure that messages are applied between ringback tones and discontinued during the tones. In this manner, the messages are clearly heard by the calling party without interfering with the ringback signal. The messages are terminated when the called party answers the call and goes off hook. It is also possible for messages to be applied during ringback tones as well as between them, although it is usually not desirable to superimpose a message over a ringback tone.

A ringback detector is not necessary if the call is an intra-office call. The switch already knows precisely when ringing tone is applied and interrupted (The ringback signal is usually interrupted by a device called an interrupter).

The message application equipment of the present invention can be connected with the telecommunications network at various locations and in various ways. For example, the equipment can be bridged onto the calling party's customer line in the existing switching network of the central office or PBX. Then, the equipment functions much like other service circuits and is switched onto the calling customer lines by the existing switching network. The switching network can be programmed to switch the equipment onto selected lines which can be determined in a number of ways, such as according to the identity of the called party or calling party.

Alternatively, the message applying equipment can be bridged onto selected customer lines between the customer station and the terminal interface in the central office Another alternative is to bridge the equipment onto the trunks such that messages are applied only for inter-office calls. The equipment can also be connected in the service circuit complex such that an audible ringback signal and a recorded message are applied to all calls. Still another possible alternative is to connect the equipment between the terminal interface and switching network.

As previously suggested, it is preferred that messages be applied to only selected customer lines, although the system can be implemented to transmit messages to all callers. In one possible application of the system, the telephone company can give customers the option of paying reduced rates (subsidized by advertisers) or paying full rates without commercial messages being transmitted on their lines. Some customers will elect the lower rates and some will not, so it is desirable to be able to select which customer lines are to receive messages. As another example, if a particular airline has commercial flights from Chicago to New York, the airline may want to advertise only to callers in Chicago who call the New York area (thinking that they are more likely to fly to New York than the general population). Again, only certain callers would receive commercial messages, and these callers would be selected according to the identity of the called party (identified by the area code of the dialed number or by the long distance company chosen by a customer in what are known as "equal access" central offices).

The system is especially well suited for local advertising because the advertising messages are applied to callers that are linked to a particular central office or PBX. Local, political and civic messages are also possible; i.e., "vote for Jones for Mayor". In addition, corporate messages and announcements can be made in PBX's or private switching systems; i.e., "turn in time sheets on Monday" or "Jones has been promoted to company Vice President". The transmission of stock market information, the latest news or weather, musical notes or virtually any other type of data can be carried out in accordance with the present invention, and this makes effective use of the telecommunications systems during times that are otherwise not used to advantage.

DESCRIPTION OF THE DRAWINGS

In the accompanying drawings which form a part of the specification and are to be read in conjunction therewith and in which like reference numerals are used to indicate like parts in the various views:

FIG. 4 is a functional block diagram of a switching center equipped with a message applying system implemented according to still another embodiment of the invention;

DETAILED DESCRIPTION OF THE INVENTION

Figure 1:
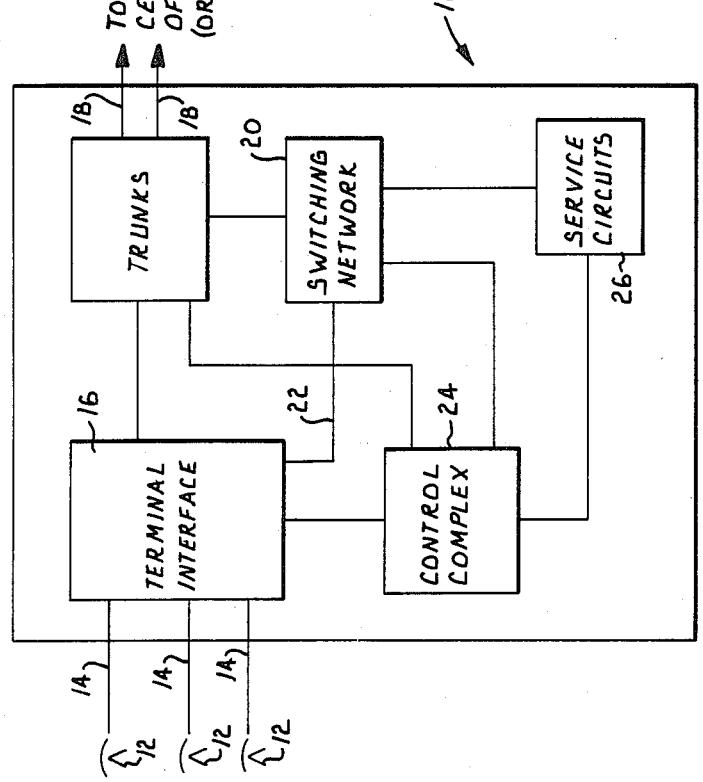
FIG. 1 is a functional block diagram of a typical telephone company switching center or PBX.
Figure 2:
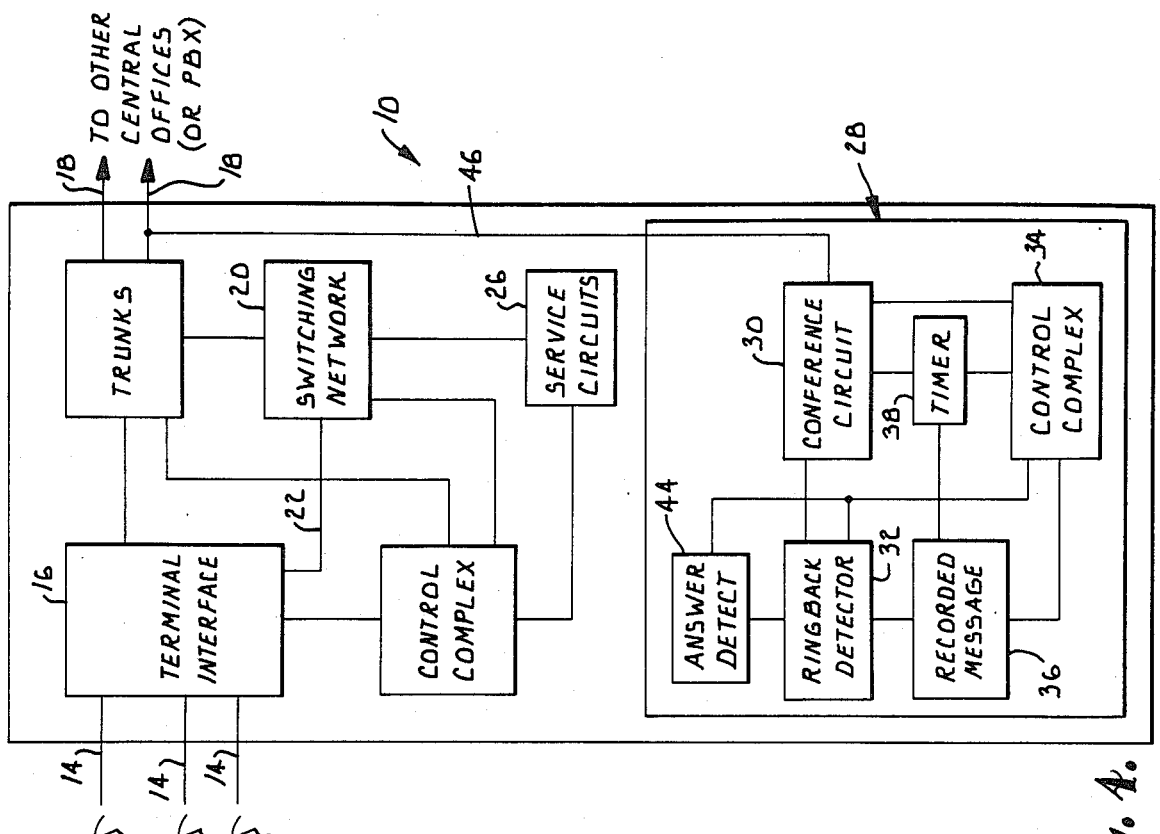

Referring now to the drawings in more detail and initially to FIG. 1, numeral 10 generally designates a conventional switching system which is typically a telephone company central office but which may be a key telephone, a private branch exchange (PBX) or another type of switching center. Individual customer stations 12 are equipped with terminal equipment which is typically a conventional telephone set. The customer stations 12 are connected with the switching system 10 by individual customer lines 14 which are typically paired wires forming a loop when connected through the switchhook contacts of the telephone set at the customer station. The switching system 10 supervises the customer lines 14 to determine whether the line is idle (on hook) or busy (off hook).

The switching system 10 is provided with three main functional equipment groups and with various auxiliary groups, depending upon its particular application. The main groups of equipment include the terminal interface 16 which is used to connect all of the customer lines 14 with the switching system 10 and also to connect all trunks 18 to the switching system. The trunks 18 are transmission lines or paths which connect the switching system 10 to other switching systems such as other central offices or PBX's. The second main equipment group in the switching system is a switching network 20 which provides communication paths between the various customer lines 14 and trunks 18. The switching network 20 is connected with the terminal interface 16 by transmission paths 22. The third main group of equipment is the control complex 24 which controls all other functions.

The peripheral equipment of the switching system 10 includes various service circuits 26. The service circuits are special equipment such as dial tone generators, digit receivers, ringback tone generators, busy tone generators, wrong number announcements and changed number announcements. The appropriate service circuit is switched into the communication path by the switching network 20 under the control of the control complex 24.

The control functions performed by the switching system 10 are manifold. The customer lines 14 are supervised to determine transitions from idle to busy, thus indicating a demand for service. The calling customer line is identified for billing purposes, and a path is established through the switching network 20 to an idle digit receiver in the service circuits block 26. At the same time, a tone generator in the service circuit block is bridged onto the line and activated to transmit a dial tone to the calling customer line. When the first digit of the called party address is received, the dial tone generator is disconnected, and the digit is registered. The remaining digits of the address are received and interpreted, and the digit receiver is then disconnected.

The address is translated into a designation of the equipment termination of the called line (or trunk if the call in an inter-office call), and the called line is tested to determine whether it is in an idle or busy status. If the called address is busy, the calling customer line is connected to a busy tone generator through the switching network 20. When the calling party then hangs up the phone and reverts to "on hook" status, the connection is broken.

If the called line is idle, an idle path through the switching network is searched and, if an idle path is available, it is reserved, the called line is connected to a ringing generator, and the calling line is connected to an audible ringback tone. The ringback tone is applied by a ring back generator which applies the ringback tone at 440 or 480 Hz. Each ring back tone has a duration of 2 seconds, and there is an interval of 4 seconds between successive ringback tones.

When the called party answers the call by going off hook, the terminal interface equipment 16 detects the off hook condition, and the control complex 24 then causes disconnection of the ringing generator and the audible ring back generator. The calling and called lines are connected through the switching network 20 along the path that has been reserved. The network path remains established for the duration of the call. When either party goes back on hook, the transition from off hook to on hook status is detected by the terminal interface equipment 16, and the control complex 24 disconnects the network path and restores the lines to the idle state.

If the call is a distant call requiring connection through another switching system connected with the called line, the control complex 24 in the originating switching system searches for an idle trunk to the distant (or an intermediate) office. If found, the address digits are transmitted to the distant office and the calling line is connected to the trunk through the switching network 20 in the originating office. The on hook detection and disconnect operation occur in substantially the same manner as for a local call that is routed through a single switching system.

The switching network 20 establishes the communication paths between the calling and called lines or between the calling line and an available trunk which leads to the terminating central office The switching network 20 can use either space division switching techniques or time division techniques. The switching can take place by the action of mechanical switches, although stored program controlled digital switching is more often used in modern switching systems.

As thus far described, the telecommunications network and the switching system 10 are conventional.

In accordance with the present invention, the switching system 10 is equipped with a message applying device which is shown in block diagram form in FIGS. 2–6 and generally designated by numeral 28. With specific reference to FIG. 2, the device 28 includes a conference circuit 30 which may be digital or analog and which is bridged onto the telecommunications network to couple device 28 with the switching system 10. The conference circuit 30 is connected with a ringback detector 32 which serves to detect the application of ring back signals to calling customer lines 14. It should be noted that the ringback detector is not necessary on an intra-office call. A control complex 34 in device 28 controls its functions in much the same manner as the control complex 24 controls the equipment in the switching system 10. A recorded message announcement device 36 contains recorded messages which are to be applied by the device of the present invention. A timing circuit 38 functions to time the application of the recorded messages such that they are applied between ringback tones, as will be explained more fully.

The recorded message announcement device 36 may be a device of the type marketed by the Cognitronics Company under the trade designation SRA. The SRA device is a single channel, microprocessor control, digital intercept announcer that applies voice messages to telephone lines. It should be noted that other recorded message announcers can be used as well, including digital read only memory (ROM) chips, compact disks, cassette tapes or other storage buffers.

Figure 2:
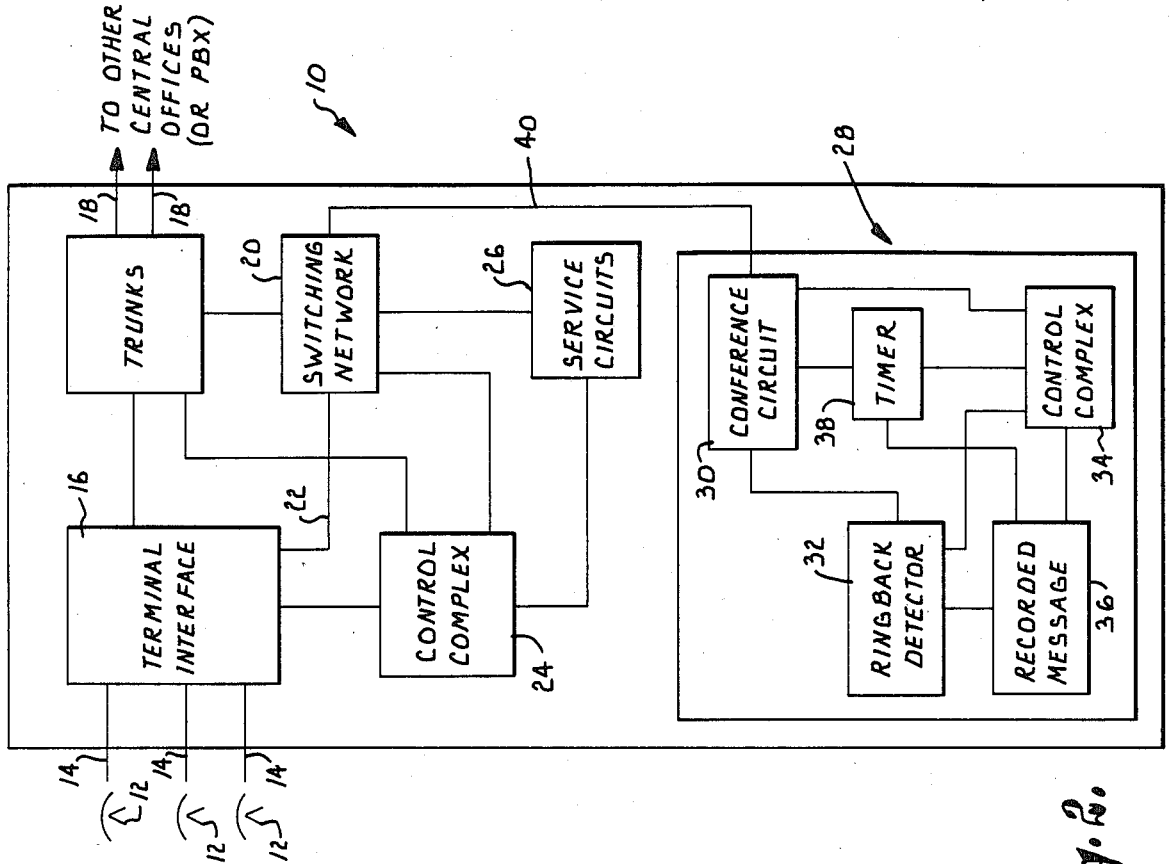
FIG. 2 is a functional block diagram of a switching center equipped with a message applying system implemented according to a preferred embodiment of the present invention.

In the implementation of the invention illustrated in FIG. 2, the conference circuit 30 is connected with the switching network 20 by a transmission path 40. In this implementation, device 28 functions in a manner similar to the service circuits 26. The switching network 20 switches the transmission path 40 onto a calling customer line 14 which is attempting to place a call to another customer, either local or remote. The switching network 20 can be programmed to switch the transmission path 40 onto the customer lines of all calling parties or only selected customers. The selected customer lines which are to receive messages may be selected according to the identity of the calling customer, as by switching the transmission path 40 onto calls placed from customer stations having a particular prefix or telephone number or any one of a number of prefixes or numbers. Alternatively, the switching network 20 can be programmed to switch the transmission path 40 onto calling customer lines 14 in accordance with the identity of the called party (or the calling party's designated long distance carrier in an "equal access" central office). In this instance, the area code or prefix of the dialed number (or the code of the designated carrier) determines whether or not the transmission path 40 is switched onto the calling party's line.

In operation of the system, when a calling customer at one of the customer stations 12 goes off hook and dials a number which addresses a customer to be called, the audible ringback equipment in the service circuit block 26 is switched onto the calling party's line during the time when the ring signal is being applied to the called party. If the program of the control complex 24 indicates that the calling party is to receive a recorded message, the transmission path 40 is switched onto the communications path, and the ringback detector 32 detects the ringback signal that is being applied to the calling party line (except in the case of an intra-office call when the ringback detection is not required). The control complex 34 then activates the message announcer 36 in order to initiate the application of a recorded message to the line of the calling party. The timer 38 performs the timing function of assuring that the messages in the announcer 36 are initiated at the end of a ringback tone and terminated prior to the beginning of the next successive ringback tone. In this manner, the timer 38 functions to prevent the messages from being applied at the same time as a ringback tone is generated. However, it should be understood that in some instances, a recorded message can be superimposed on a ringback tone without significant adverse effects.

The messages that are contained within the announcer 36 are applied along the transmission path 40 and are routed through the switching network 20 and the terminal interface 16 to the calling customer line 14. During the ringback period while the calling customer is waiting for the called customer to answer the call, one or more recorded messages are thus transmitted to the calling customer Examples of the types of messages that can be applied are commercial advertising messages such as "fly XYZ airline" or "buy ABC widgets". Political announcements such as "vote for Jones for Mayor" can also be transmitted to calling customers. In addition, music, stock market information, commodity pricing information, news or weather data, or virtually any other kind of data can be transmitted to the calling customer during the ringback period. The announcement device 36 applies voice frequency tones on the telephone lines so that the messages are intelligible to the calling party. Alternatively, tones that are detected by computers or other equipment can be applied. The band pass range on telephone lines is approximately 0–4000 Hz.

Preferably, each message in the announcer 36 has a duration of approximately 4 seconds which is the interval between successive ringback tones. This permits a complete message to be transmitted during each interval (or during every other interval or every third interval). It has been determined empirically that three or four ringback tones are generated during the average telephone call. Consequently, it is possible for a complete eight second message to be transmitted, with half of the message occurring between the first two ring back tones and the second half of the message being applied during the interval between the second and third tones. It is also possible that only a single message lasting four seconds or less will be applied during any one call attempt. It is also possible for messages to be superimposed on ringback tones, as previously suggested.

When the called party goes off hook to answer the call, the answer detect equipment in the switching system 10 detects the off hook status of the called party and switches the ring generator and the ringback tone out of the communications path (except in the case of intra-office call when the control complex 24 will automatically disestablish path 40 through the switching network 20 upon answer). At the same time, the transmission path 40 is switched out of the communications path by the switching network 20 under the control of the answer detecting equipment. In this manner, the recorded messages are terminated when the called party answers the telephone.

It should be understood that multiplexing techniques and other techniques can be used to permit recorded messages to be applied to more than one customer at a time. Different messages can be applied at different times of day or different days of the week or month, and different messages can be applied to different customers selected according to their identity or the identity of the party they are attempting to call, or by the identity of the long distance company they have chosen in "equal access offices". In this way, commercial and political messages can be targeted for particular customers or types of customers to whom the advertising party wishes to reach. It is also noteworthy that all of the calling customer stations 12 are local to the particular switching system 10, and the system is thus well suited for local advertising, commercial, political or otherwise. Regional or national advertising is also possible. Because of the frequency with which telephone calls are made, the potential audience that can be reached is huge. It is also important to note that since detailed call records are available, advertisers can be informed of exactly which callers have received their messages and when, thus providing "harder" information than results from the statistical techniques typically used in the AM/FM broadcast industry.

Figure 3:
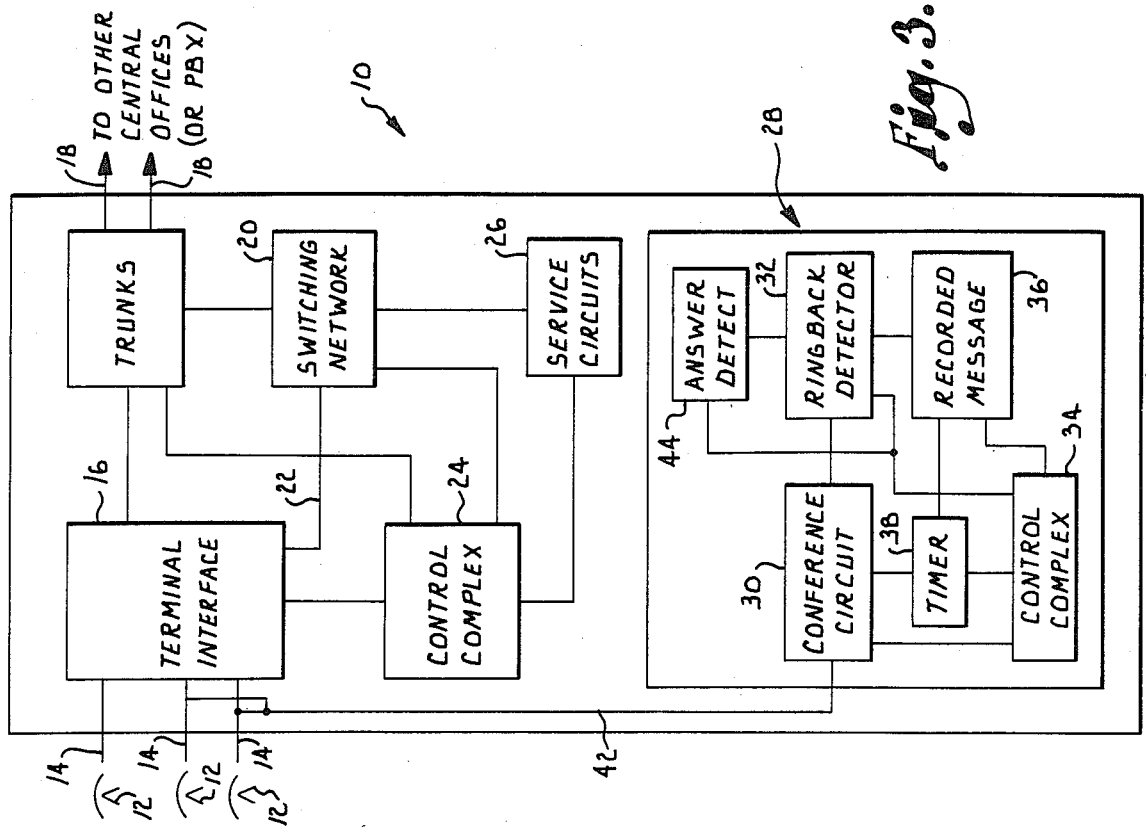
FIG. 3 is a functional block diagram of a switching center equipped with a message applying system implemented according to another embodiment of the present invention.
Figure 6:
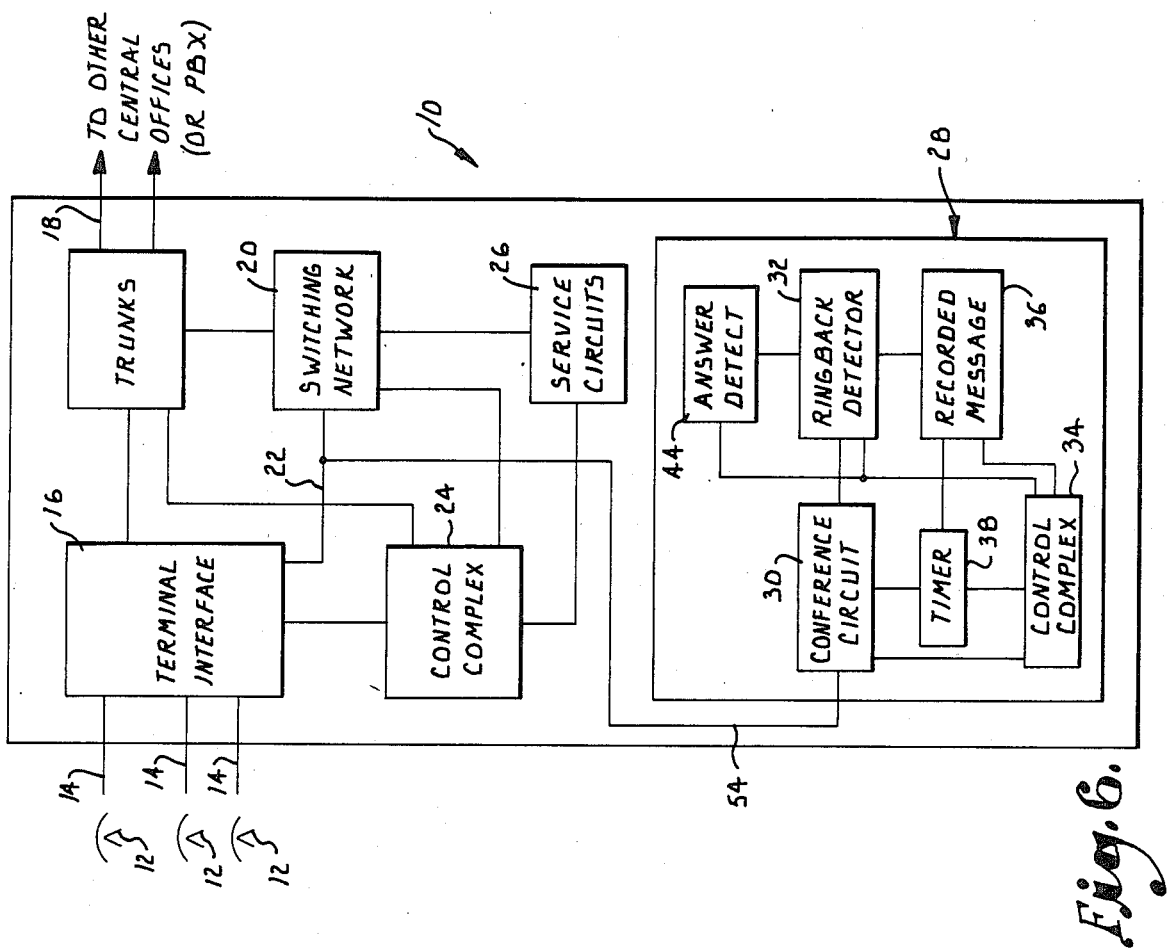
FIG. 6 is a functional block diagram of a switching center equipped with a message applying system implemented according to still another embodiment of the invention.

Referring now to FIG. 3, the implementation of the message applying device 28 differs from the implementation shown in FIG. 2 in that the FIG. 3 arrangement involves connection of the conference circuit 30 directly to one or more selected customer lines 14 along transmission path 42. In this implementation, the customers who are to receive messages are directly selected and directly connected to the transmission path 42 (preferably by switching). It is noted that the implementation shown in FIG. 3 does not involve connection of device 28 to the telecommunications network through the switching network 20. Accordingly, the device 28 shown in FIG. 3 is equipped with its own answer detect equipment 44 which detects the off hook status of the called party in order to terminate the message at that time.

The implementation of the invention shown in FIG. 3 is particularly well suited for a situation where the identity of the calling party is used to determine whether or not a message is to be applied. The selection can be carried out conveniently simply by connecting the transmission path 42 to those customer lines 14 or stations 12 which are selected and not making the connection with customer lines or stations 12 which are not to receive messages.

FIG. 4 shows another implementation of the invention in which the conference circuit 30 of device 28 is connected with one or more of the trunks 18 by transmission path 46. Again, the answer detect equipment 44 is required since the transmission path 46 bypasses the switching network 20. In this implementation, messages are applied only to inter-office calls and perhaps only to calls made to particular selected distant offices. The transmission path 46 can be connected to all of the trunks 18 for the switching system or only to the trunks of selected offices. In any event, all calls that go through a trunk to which path 46 is connected activate the device 28 and result in the application of a message to the calling party making the inter-office call.

Figure 5:
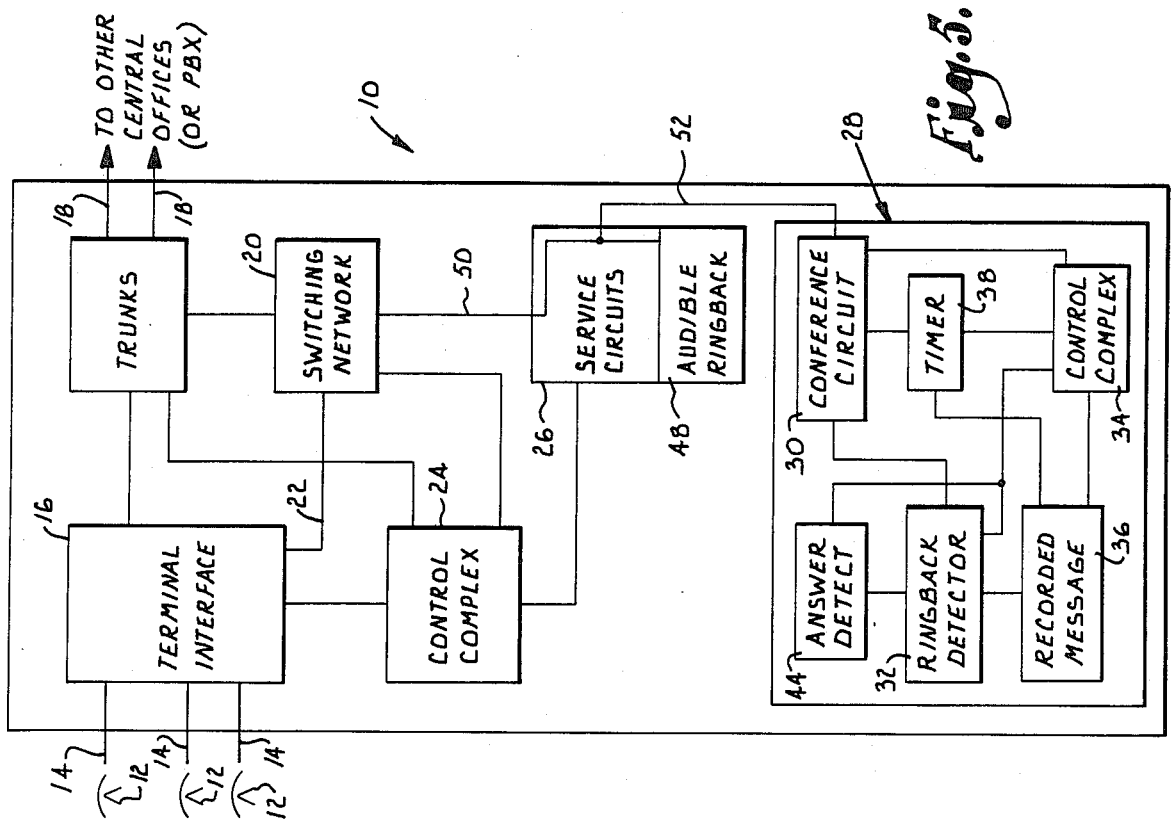
FIG. 5 is a functional block diagram of a switching center equipped with a message applying system implemented according to yet another embodiment of the invention.

In the implementation of the invention shown in FIG. 5, the audible ringback generator 48 which is included in the service circuit block 26 is connected with the switching network via line 50. The conference circuit 30 of device 28 is connected directly with path 50 along transmission path 52. Accordingly, whenever an audible ring back signal is being applied along line 50 to a calling customer, device 28 is activated and applies messages which accompany the ringback tones. In this implementation, all calling parties served by the audible ringback generator 48 receive messages during the ringback period.

The implementation of the invention shown in FIG. involves connection of the conference circuit 30 with the transmission path 22 which extends between the terminal interface 16 and the switching network 20. Transmission path 54 extends from the conference circuit and is tied to transmission path 22. Again, whenever any calling party is receiving ring back tones, the device 28 is activated to apply recorded messages to the calling party's line.

It is contemplated that telephone companies will make charges to advertisers or others who wish to use the telephone network to transmit recorded messages to callers. The additional revenue received by the telephone company can be used to reduce telephone rates in general. Alternatively, customers can elect whether or not to receive the service. If they elect to receive recorded messages, their rates can be reduced. Those that elect to forego the service will pay the full rate. In this situation, it is necessary to be able to select which calling parties are to receive messages and which are not. Consequently, the implementations shown in FIGS. 2 and 3 are preferred. In situations where the application of a message is dependent upon the identity of a called party, (or the calling party's long distance carrier), the implementation of FIG. 2 is preferred since the switching network can be programmed to apply an announcement for all calls directed to a particular area (as determined by the area code or prefix digits or a particular long distance carrier).

It is thus apparent that the method and apparatus of the present invention takes advantage of essentially wasted time during telephone call setup to make use of the existing telephone facilities for the transmission of information which may or may not be of a commercial nature. Weather, news and other informational messages can be transmitted, as can civic announcements and other similar types of messages. In addition, music or virtually any other voice frequency tones can be transmitted. It is also to be noted that data within the telephone line bandpass frequency range can be transmitted to the calling party during telephone call setup and received by a modem or other suitable equipment.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a telecommunications system having a plurality of switching systems interconnected by trunks, a plurality of customer stations arranged in groups with each group being served by one of the switching systems, a plurality of customer lines connecting each switching system with the group of customer stations served thereby, a switching network in each switching system for establishing communication paths between calling customer stations and called customer stations addressed by the calling stations and means in each switching system for applying periodic ringback signals to the line of each calling station served thereby when a called station addressed by the calling station is idle, the improvement comprising:
   means for detecting customer lines to which ringback signals are being applied;
   communication signal applying means in each switching system for applying preselected communication signals to selected customer lines to which ringback signals are being applied, said communication signal applying means in each switching system applying said communication signals only to customer lines for the group of customer stations served by the corresponding switching system and said selected customer lines being selected according to the identity of the called customer station; and
   means for terminating application of said communication signals to each customer line when ringback signals thereto are terminated.

2. The improvement of claim 1, wherein the ringback signals are each applied for a preselected duration and with a preselected interval between successive ringback signals, and including timing means for timing the application of the communication signals such that the latter are applied during the intervals between successive ringback signals are discontinued for the duration of each ringback signal.

3. The improvement of claim 2, wherein said communication signals comprise a plurality of discreet messages each having a duration substantially equal to the interval between successive ringback signals.

4. In a telecommunications network of the type having a plurality of switching systems interconnected by trunks, a plurality of customer stations connected to each switching system by customer lines, a switching network in each switching system for establishing communications paths between calling customer stations, means in each switching system for applying a ring signal to the customer line of each called station addressed by a calling station, means in each switching system for applying periodic ringback signals to the customer line of each calling station when a called station addressed thereby is idle, and means in each switching system for applying a busy signal to the customer line of each calling station when a called station addressed thereby is not idle, the improvement comprising:
   detecting means for detecting calling customer lines to which ringback signals are being applied;
   communication signal applying means for applying preselected communication signals to selected customer lines to which ringback signals are being applied, said communication signal applying means being connected in a manner to bypass said switching network and said selected customer lines being selected according to the identity of the called customer station;
   timing means for timing the application of said communication signals in a manner such that the communication signals are applied between successive ringback signals and discontinued during each ringback signal; and
   means for terminating the communication signals to each calling customer line when the ringback signals are terminated.

5. The improvement of claim 4, wherein said communication signals comprise a plurality of discreet messages each having a duration substantially equal to the interval between successive ringback signals.

6. A method of applying messages to customer stations in a telecommunications network in which the customer stations are connected by customer lines to switching systems having trunk connections with other switching systems, a switching network in each switching station for establishing communications paths between calling customer stations and called customer stations, and ringback equipment for applying ringback signals having a preselected frequency and duration to a calling customer line addressing an idle called customer station, said method comprising the steps of:

detecting the application of ringback signals to a selected calling customer line selected according to the identity of the called customer station addressed;

applying said messages to the selected calling customer line between successive ringback signals in a manner to bypass said switching network; and terminating said messages when the ringback signals are terminated.

7. In a telecommunications system having a plurality of switching systems interconnected by trunks, a plurality of customer stations arranged in groups each served by a different switching system with the customer stations in each group being connected to the corresponding switching system by customer lines, a switchhook for each customer station for indicating whether the station is on hook or off hook, a stitching network in each switching system for establishing communication paths between calling customer stations and called customer stations addressed by the calling stations, means in each switching system for applying periodic ringback signals to the line of each calling stations served thereby when a called station addressed by the calling station is on hook, and means for terminating the ringback signals when an addressed called station goes off hook to respond to the call, message applying apparatus comprising:

an announcer in each switching system containing a plurality of recorded messages;

means in each switching system for applying said messages to selected customer lines for calling stations served by the corresponding switching system when ringback signals are being applied to said selected customer lines, said selected customer lines being selected according to the identity of the called customer station;

timing means for timing the application of said messages in a manner to effect application of the messages between successive ringback signals and discontinuance of the messages during each ringback signal; and means for deactivating said announcer in each switching system to terminate application of messages when the called station addressed by the calling station goes off hook to respond to the call.

8. Apparatus as set forth in claim 7, wherein:

the ringback signals are each applied for a preselected duration with a preselected interval between successive ringback signals;

each message has a duration substantially equal to the interval between successive ringback signals; and said timing means is operable to time the application of said messages in a manner to initiate each message at the end of a ringback signal.

9. Apparatus as set forth in claim 7, wherein said means in each switching system for applying said messages applies the messages in a manner to bypass the switching network in the corresponding switching system.

10. In a telecommunications system having a plurality of switching systems interconnected by trunks, a plurality of customer stations arranged in groups with each group being served by one of the switching systems, a plurality of customer lines connecting each switching system with the group of customer stations served thereby, a switching network in each switching system for establishing communication paths between calling customer stations and called customer stations addressed by the calling stations and means in each switching system for applying periodic ringback signals to the line of each calling station served thereby when a called station addressed by the calling station is idle, the improvement comprising:

means for detecting customer lines to which ringback signals are being applied;

communication signal applying means in each switching system for applying preselected communication signals to selected customer lines to which ringback signals are being applied, said communication signal applying means in each switching system applying said communication signals only to customer lines for the group of customer stations served by the corresponding switching system;

means for terminating application of said communication signals to each customer line when ringback signals thereto are terminated; and said communication signal applying means in each switching system being connected to at least one of the trunks for the corresponding switching system, whereby the communication signals are applied only for calls between customer stations served by different switching systems.

11. In a telecommunications network of the type having a plurality of switching systems interconnected by trunks, a plurality of customer stations connected to each switching system by customer lines, a switching network in each switching system for establishing communications paths between calling customer stations and called customer stations addressed by the calling stations, means in each switching system for applying periodic ringback signals to the customer line of each calling station when a called station addressed thereby is idle, and means in each switching system for applying a busy signal to the customer line of each calling station when a called station addressed thereby is not idle, the improvement comprising:

detecting means for detecting calling customer lines to which ringback signals are being applied;

communication signal applying means for applying preselected communication signals to selected customer lines to which ringback signals are being applied, said communication signal applying means being connected in a manner to bypass said switching network, each switching system having one of said communication signal applying means and said communication signal applying means for each switching system being connected to at least one of the trunks for the corresponding switching system, whereby the communication signals are applied only for calls between customer stations served by different switching systems;

timing means timing the application of said communication signals in a manner such that the communication signals are applied between successive ringback signals and discontinued during each ringback signal; and means for terminating the communication signals to each calling customer line when the ringback signals are terminated.

12. A method of applying messages to customer stations in a telecommunications network in which the customer stations are connected by customer lines to switching system having trunk connections with other switching systems, a switching network in each switching station for establishing communications paths between calling customer stations and called customer stations, and ringback equipment for applying ringback signals having a preselected frequency and duration to a calling customer line addressing an idle called customer station, said method comprising the steps of:

detecting the application of ringback signals to a selected calling customer line which is selected by selecting a calling customer line addressing a called customer line connected with a switching system different from the switching system to which the calling customer line is connected;

applying said messages to the selected calling customer line between successive ringback signals in a manner to bypass said switching network; and terminating said messages when the ringback signals are terminated.

* * * * *